Oct. 10, 1933.                C. A. WEYBRECHT ET AL                1,930,446
                           ELECTRODE COATING APPARATUS
                              Filed Oct. 28, 1929         2 Sheets-Sheet 1

INVENTOR
Cyril A. Weybrecht
Edgerton R. Parker
BY Evans & McCoy
ATTORNEYS

Oct. 10, 1933.  C. A. WEYBRECHT ET AL  1,930,446
ELECTRODE COATING APPARATUS
Filed Oct. 28, 1929   2 Sheets-Sheet 2
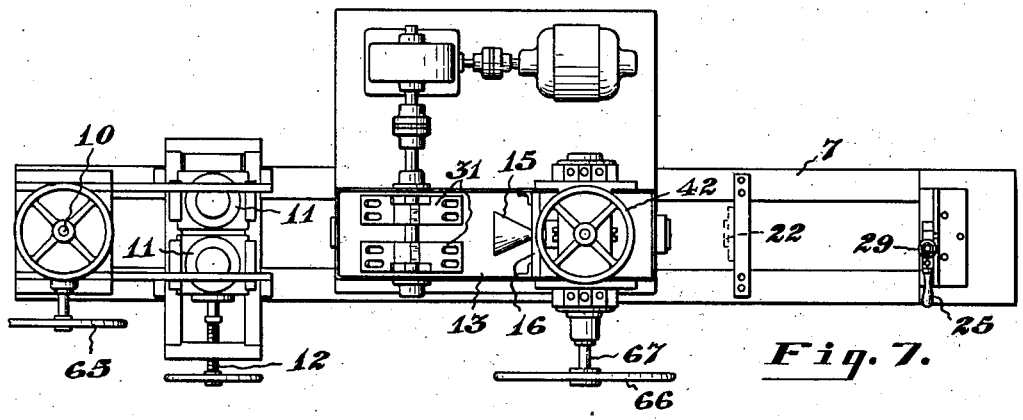
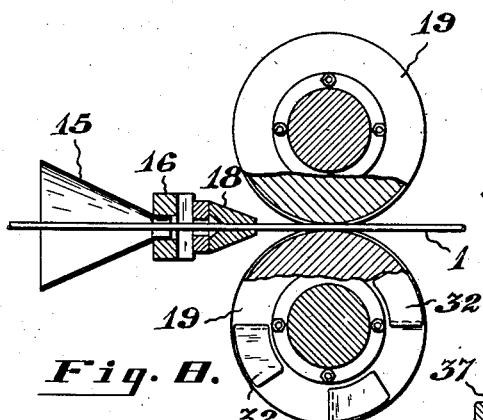
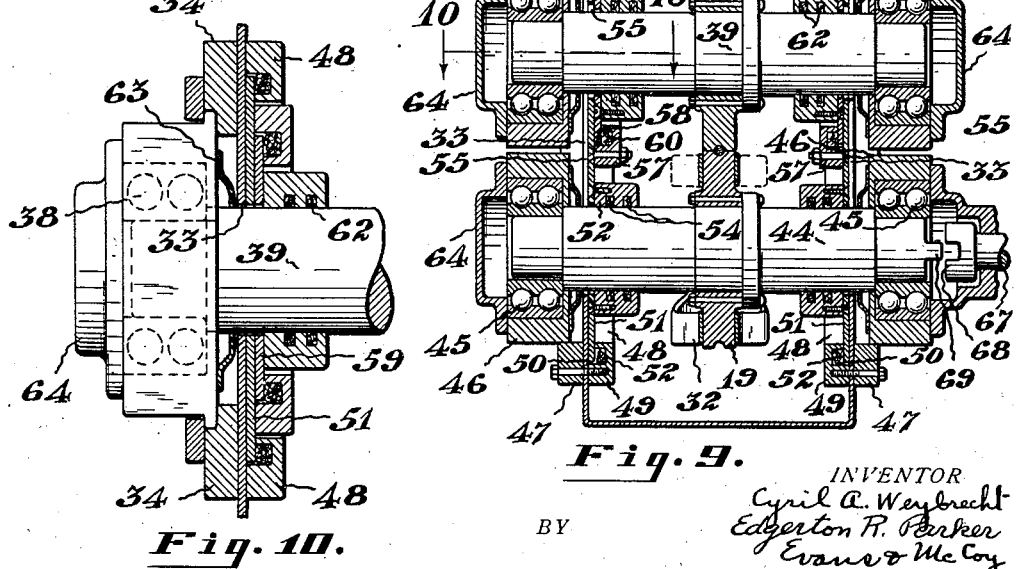
INVENTOR
Cyril A. Weybrecht
Edgerton R. Parker
BY Evans & McCoy
ATTORNEYS Patented Oct. 10, 1933

1,930,446

UNITED STATES PATENT OFFICE

1,930,446

ELECTRODE COATING APPARATUS

Cyril A. Weybrecht, Euclid Village, and Edgerton R. Parker, East Cleveland, Ohio, assignors to Una Welding & Bonding Company, Cleveland, Ohio, a corporation of Delaware Application October 28, 1929. Serial No. 403,108

11 Claims. (Cl. 219—8)

This invention relates to a method of and apparatus for manufacturing electrodes for use in electric arc welding and more particularly to a method of and apparatus for producing a fluxed welding electrode having characteristics advantageous for either hand or automatic arc welding.

An object of the present invention is to provide a method of and apparatus for disposing fluxing material in indentations which are distributed along the length of the metal rod in such a manner that the rod may be bent or otherwise roughly handled without dislodging the fluxing material.

A further object is to provide a method by which the fluxing material is densely compacted in the compressions of the rod flush with the surface of the metal.

A further object is to provide flux applying apparatus in which the indented rod is passed through a flux bath and the flux is compacted into the indentations of the rod while passing through the bath.

A further object is to provide removable and interchangeable compression rolls within the flux bath for compacting the fluxing material in the indentations and to provide means for excluding the fluxing paste from the bearings of the roll shafts.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 7 is a plan view of the apparatus shown in Fig. 4.

Fig. 8 is a fragmentary section showing the flux applying devices within the flux tank.

Fig. 9 is a section taken on the line indicated at 9—9 in Fig. 4.

Fig. 10 is a fragmentary horizontal section taken on the line indicated at 10—10 in Fig. 9.

Figure 1:
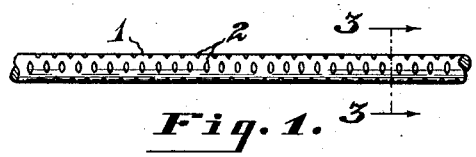
Figure 1 is a side elevation showing a portion of the welding rod produced by the method of the present invention.
Figure 2:
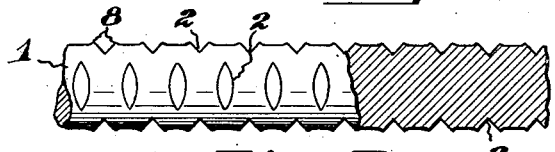
Fig. 2 is a side elevation partially in section showing a portion of a metal rod after it has been passed through indenting rolls and before it has been subjected to the smoothing and flux applying operations.
Figure 3:
Fig. 3 is a section taken on the line indicated at 3—3 in Fig. 1.

Figs. 1 and 3 of the drawings show the welding rod produced by the method and apparatus of the present invention, and Fig. 2 shows the indented rod before it is subjected to the method of the present invention. The welding rod, which is indicated by the reference numeral 1, is provided with transverse indentations 2 which may be formed in the rod in any suitable manner, preferably by passing the rod between toothed rolls and these indentations, as shown in Fig. 3, are all filled with fluxing material 3 flush with the cylindrical surface of the rod. The electrode rod 1 is formed of wire stock and the indented wire, such as shown in Fig. 2, is wound upon a reel 4 which is mounted to turn about a vertical axis on a pedestal 5. The wire is drawn from the reel 4 and wound upon a suitable wire drawing reel 6 and the operations which comprise the method of the present invention are performed upon the wire during its passage from the reel 4 to the reel 6. The apparatus of the present invention is all mounted upon a suitable table 7 interposed between the reels 4 and 6.

As shown in Fig. 2 of the drawings, the surface of the rod is roughened by the indenting operation, projections 8 being formed along the edges of the indentations 2 in the passage of the wire from the reel 4 to the reel 6. The initial operation on the indented wire is a rolling operation to press down the projections 8 and form a smooth cylindrical surface. The wire first passes between a pair of grooved horizontally disposed rolls 9 which are mounted upon the end of the table 7 adjacent the reel 4, the upper of the rolls 9 being mounted for vertical adjustment and being provided with an adjusting screw 10 by means of which it may be adjusted toward and away from the lower roll to vary the pressure exerted upon the rod.

The wire then passes through a pair of grooved vertically disposed rolls 11 which are mounted on the table adjacent the rolls 9, one of the rolls 11 being mounted for lateral adjustment and being provided with an adjusting screw whereby it may be adjusted toward and away from the companion roll to vary the pressure exerted upon the rod.

Centrally of the table 7, there is mounted a receptacle 13 which is adapted to contain fluxing material in the form of a paste and the wire rod passes directly through the receptacle 13 and through the bath of fluxing material therein. The rod enters the flux receptacle through an apertured steel plate 14 attached to the side wall of the receptacle over an opening in said wall, the steel plate 14 having an opening of a diameter corresponding to that of the rod so that the rod has a close fit in the opening and prevents leakage of fluxing material from the receptacle.

Within the receptacle 13, the rod passes through a funnel 15, which is submerged in the fluxing paste. The funnel 15 is horizontally disposed and is mounted in a supporting block 16, to the forward side of which is attached a die 18 through which the rod is drawn and which has an aperture of a diameter such that the rod has a close fit therein, so that the rod is subjected to rubbing compression in passing through the die and the fluxing material is compacted in the indentations. The funnel 15 serves to hold the fluxing paste against the rod as it approaches the die 18 and to create a slight pressure on the paste surrounding the rod. Immediately in advance of the die 18, a pair of compressing rolls 19 are mounted. These rolls are horizontally disposed and provided with registering circumferential grooves which are semi-cylindrical in cross section to receive the rod, the rolls 19 serve to compress and smooth the rod and at the same time to compress the fluxing material lodged in the indentations of the rod. The rod passes out through an aperture 20 in the forward wall of the receptacle 13. This aperture is of a diameter somewhat greater than that of the rod and to the outer side thereof, there is attached a rubber wiper 21, which has an aperture of a size to closely fit the surface of the rod and prevent any material amount of fluxing material being drawn out with the rod. Immediately in advance of the receptacle 13, a second wiper 22 may be mounted, which may also be in the form of an apertured piece of sheet rubber to wipe off excess material which may have adhered to the exterior of the rod.

Adjacent the forward end of the table, there is mounted a final wiper which consists of a fixed lower block 23, which is provided with a semi-cylindrical groove to receive the rod and upper block 24 provided with a groove registering with the groove of the lower block. The upper block is pressed downwardly upon the lower block and the rod is subjected to rubbing compression in passing between the two blocks so that the surface of the rod between indentations is wiped clean and the fluxing material in the indentations is subjected to a final compression so that the fluxing material is very firmly lodged in the indentations and the rod may be bent or otherwise subjected to rough handling without dislodging the fluxing material.

Means is provided for applying the desired amount of pressure upon the rod as it passes between the wiping blocks 23 and 24, the pressure being applied by means of a hand lever 25 which is held in place by means of a vertically disposed bolt 26 secured to the frame and a vertically disposed pin 27 also secured to the frame, the lever being provided with apertures in which the bolt and pin are loosely received, so that the lever may have a vertical rocking movement upon the pin and bolt. The bolt 26 is provided with a nut 28 and washer 29 at its upper end and a compression coil spring 30 is interposed between the washer 29 and the lever 25, the pressure of the spring 30 being exerted through the lever to the upper block 24 of the wiper through the lever 25 which bears upon the block 24 at its inner end. The outer end of the lever 25 may be grasped in the hand and lifted whereby the lever is caused to fulcrum about its inner end bearing on the block 24, increasing the tension of the spring 30 with the result that the pressure exerted on the block 24 is increased.

The flux paste in the receptacle 13 is continuously agitated to maintain uniform consistency by means of a paddle wheel 31 which is continuously rotated by suitable means such as an electric motor and also by means of blades or paddles 32 attached to the side faces of the lower roll 19, the roll carrying the blades or paddles being continuously rotated by the rod during its passage through the flux bath.

The rolls 19 are removably mounted in the receptacle 13 and the shafts of the rolls extend through slots 33 in the side walls of the receptacle. On the outer sides of the side walls, there are mounted vertical guide standards 34, the upper ends of which are connected by a cross bar 35 and between which there is mounted a slidable cross head 36. Bearing blocks 37 are attached to the undersides of the crosshead 36 and have a sliding fit between the guide standards 34. Within the bearing blocks 37, there are mounted ball bearings 38 which receive the ends of the shaft 39 of the upper roll 19. The crosshead 36 may be adjusted vertically to adjust the upper roll 19 toward or away from the lower roll by means of a vertically disposed screw 40 which is threaded in a nut 41 fixed in the cross bar 35. The screw 40 is provided with a handwheel 42 at its upper end and is secured at its lower end in a bearing plate 43 attached to the top of the crosshead 36. By means of the handwheel 42, the upper roll 19 may be adjusted to exert the desired pressure on the rod passing between the rolls. The lower roll 19 has a shaft 44 which projects through the slots 33 in the side walls of the receptacle and is journaled in its outer end in ball-bearings 45 which are mounted in bearing blocks 46 which are mounted to slide between the vertical standards 34. When in operative position, the bearing blocks 46 rest upon a cross bar 47 extending between the lower ends of the standards 34, so that the position of the lower roll 19 within the receptacle is fixed.

The bearing blocks 37 and 46 are mounted outside the receptacle 13 and means is provided for covering the slots 33 to prevent leakage of paste from the receptacle and to prevent entry of paste into the ball bearings in which the shafts of the rolls are mounted. Upon the interior of each of the side walls of the receptacle on opposite sides of the vertical slot 33, there are mounted vertical guide bars 48 and beneath the slots 33 extending across the space between the guide bars 48 are bottom cross bars 49. The vertical guide bars 48 and bottom bars 49 are provided with grooves 50 to receive the marginal edges of a plate 51 which is of a size to cover the slot 33 and in each of the grooves 50, there is mounted a packing 52 which bears against the edge of the plate 51 to prevent leakage. The plates 51 are carried by the shaft 44 of the lower roll, being rigidly attached to sealing collars 52, which fit over the shaft 44 on opposite sides of the roll, sealing collars 52 being provided with internal grooves to receive packing rings 54 which press against the surface of the shaft to prevent leakage of the paste along the surface of the shaft.

The sealing plates 51 are provided with openings 55 through which the shaft 39 of the upper roll extends and on opposite sides of the slot 55, each of the sealing plates has attached to the inner face thereof, vertical guide bars 56. Beneath the slot and extending between the lower ends of the guide bars 56, there is a bottom bar 57.

The guide bars 56 and bottom bar 57 are provided with grooves 58 to receive the marginal edges of a sealing plate 59, which serves to prevent leakage through the slot 55, and each of the grooves 58 is provided with packing 60 to prevent leakage around the edges of the plate. Each of the plates 59 is rigidly attached to a sealing collar 61 fitting on the shaft 39 of the upper roll, each of the sealing collars being provided with packing rings 62 to prevent leakage of paste along the surface of the shaft.

In mounting the rolls in the receptacle 13, the lower roll carrying the sealing plates 51 is lowered in place with the bearing blocks 46 resting upon the cross bars 47 outside the receptacle. The upper roll carrying the sealing plates 59 is then lowered into place until the plate 59 is engaged in the groove of the cross bar 57. When so assembled, the upper roll may be adjusted slightly with respect to the lower roll to vary the pressure exerted upon the rod in its passage between the rolls. The two plates 51 and 59 and the sealing collars 52 and 61 effectively close the slots in the side walls of the receptacle and prevent leakage of material from the receptacle, the ball bearings of the roll shafts being mounted outside the receptacle are thus protected from the fluxing paste. However, as an additional protection against entry of any liquid to the bearings, additional sealing rings 63 may be mounted between the bearings and the wall of the receptacle. The outer ends of the shaft and the ball bearings may be protected by means of suitable caps 64 attached to the bearing blocks.

Figure 4:
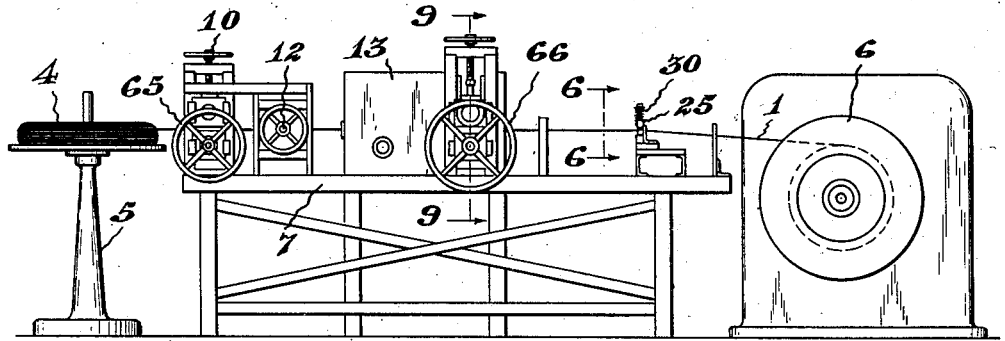
Fig. 4 is a side elevation of apparatus embodying the invention.
Figure 5:
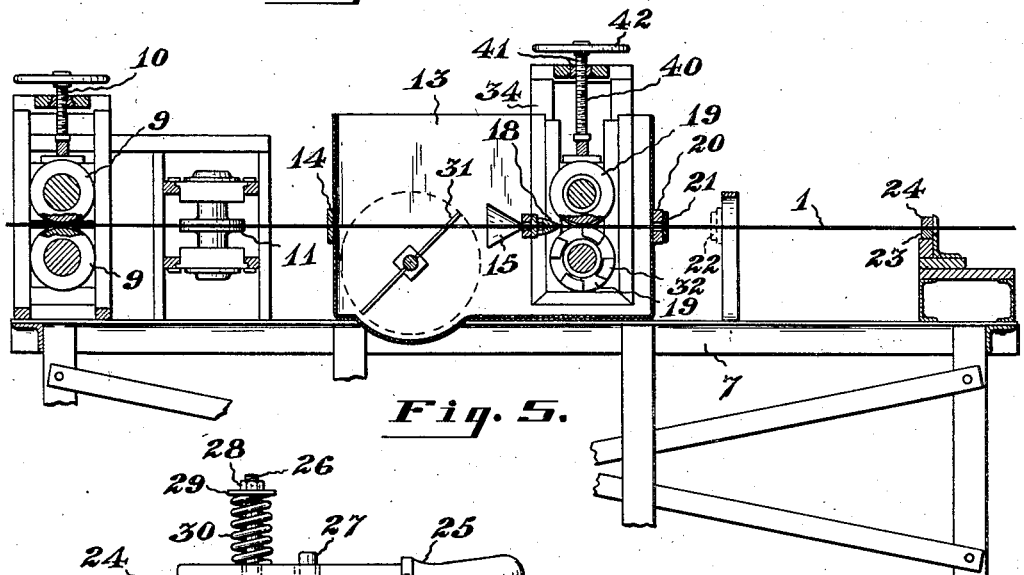
Fig. 5 is a longitudinal vertical section through the apparatus shown in Fig. 4.
Figure 6:
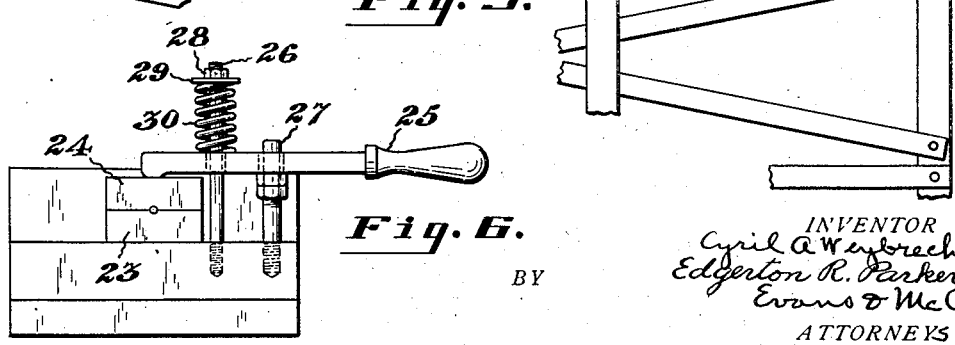
Fig. 6 is a section taken on the line indicated at 6—6 in Fig. 4.

As shown in Figs. 4 and 7, the lower of the rolls 9 and the lower of the rolls 19 may be rotated manually by means of hand wheels 65 and 66, to facilitate the threading of an end of the rod through the compressing rolls, dies and flux receptacle into engagement with the drawing reel 6. The hand wheels 65 and 66 are preferably normally disconnected from the roll shafts and as shown in Fig. 9, the handwheel may be provided with a shaft 67 axially alined with the roll shaft and provided at its end with a clutch element 68, which may be brought into driving engagement with a clutch element 69 on the end of the roll shaft by pushing the handwheel inwardly. Once the wire stock forming the electrode rod has been fastened to the drawing reel 6 and the compressing rolls properly adjusted, the rod may be rapidly drawn through the rolls, dies and flux bath, unwinding from the reel 4 and winding up on the drawing reel 6.

It will be apparent that the present invention provides a very rapid and economical method of applying fluxing material to indentations in a metal rod, that the apparatus is of simple and rugged construction, reliable in operation and will operate efficiently at a relatively high rate of speed.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. Apparatus of the character described comprising a receptacle for fluxing material having apertures in its front and rear walls through which a wire may be passed, means for drawing wire through said receptacle, and compressing rolls in the receptacle driven by the wire in its passage through the receptacle to compress fluxing material on the rod, one of said rolls having a handwheel releasably connected thereto for driving the same to thread the wire through the receptacle.

2. Apparatus of the character described comprising a receptacle for fluxing material having apertures in its front and rear walls through which a wire may be passed, means for drawing wire through said receptacle, compressing rolls in the receptacle driven by the wire in its passage through the receptacle to compress fluxing material on the rod, said rolls having shafts extending through openings in the side walls of the receptacle, bearings for the shafts outside the receptacle, and means carried by the shafts for sealing the openings in the side walls to prevent leakage of fluxing material.

3. Apparatus of the character described comprising a receptacle for fluxing material having apertures in its front and rear walls through which a wire may be passed, said receptacle having slots in the side walls thereof, a pair of superposed compression rolls in said receptacle between which the wire passes, said rolls having shafts projecting through said slots, bearings for said shafts outside the receptacle, plates carried by one of the shafts covering said slots, slots in said plate through which the shaft of the other roll passes, and plates carried by the latter shaft covering the slots of the first plate.

4. Apparatus of the character described comprising a receptacle for fluxing material having apertures in its front and rear walls through which a wire may be passed, said receptacle having slots in the side walls thereof, a pair of superposed compression rolls in said receptacle between which the wire passes, said rolls having shafts projecting through said slots, bearings for said shafts outside the receptacle, sealing collars mounted on one of said roll shafts on opposite sides of the roll, plates attached to said collars and sealing said slots, slots in said plate through which the other shaft projects, sealing collars on the latter shaft on opposite sides of the roll thereon, and plates carried by the last mentioned collars for sealing the slots in the first plate.

5. Apparatus of the character described comprising a receptacle for fluxing material having apertures in its front and rear walls through which an indented wire may be passed, a die for subjecting the wire to rubbing compression submerged in the fluxing material and axially alined with said apertures, a funnel axially alined with the die and having its small end adjacent the entrance end of said die, compression rolls also submerged in said flux for compressing fluxing material on the rod after it has passed through the die, and means for drawing the wire through the receptacle.

6. Apparatus of the character described comprising a receptacle for fluxing material having apertures in its front and rear walls through which an indented wire may be passed, a rigid wiper plate having an aperture corresponding to the diameter of the wire secured over the rear wall of the receptacle, a wiper of flexible material secured over the aperture of the front wall, means comprising submerged rollers within the receptacle for compressing fluxing material in the indentations of the wire and means for drawing the wire through the receptacle.

7. Apparatus of the character described comprising means for rotatably supporting a reel having indented wire wound thereon, a wire drawing reel spaced from the supporting reel, a flux holding receptacle between the reels having apertures in its front and rear walls through which the wire passes, aligned compressing rolls mounted between the wire holding reel and receptacle having a smooth peripheral contour for smoothing the wire, means within the receptacle for compressing fluxing material into said indentations, and means between the receptacle and drawing reel for wiping fluxing material from the surface of the wire between indentations.

8. Apparatus of the character described comprising means for rotatably supporting a reel having indented wire wound thereon, a wire drawing reel spaced from the supporting reel, a flux holding receptacle between the reels having apertures in its front and rear walls through which the wire passes, compressing rolls mounted between the wire holding reel and receptacle for smoothing the wire, said rolls having complemental grooves to receive the wire and adapted to be driven by the wire, means within the receptacle for compressing fluxing material into the indentations of the wire, and manually operable means for rotating one of said rolls for threading the wire through said receptacle and compressing means.

9. Apparatus of the character described comprising a receptacle for fluxing material having apertures in its front and rear walls conforming to the surface of an indented wire, means for drawing the wire through the receptacle, means in the receptacle for compressing fluxing material into the indentations of the wire, a wiper forwardly of the receptacle comprising upper and lower blocks having complemental grooves to receive the wire, and manually operable means for applying a variable pressure to one of said blocks.

10. Apparatus of the character described comprising a receptacle for fluxing material having apertures in its front and rear walls located below the normal line of flux in said receptacle, compression rollers having peripheral grooves, the lowwer roller being completely and the upper roller being at least partially submerged in the flux, means for drawing a wire through said apertures and between said rollers, said rollers being operated by the friction of the wire, and means for preventing the flux from escaping through said apertures.

11. The method of producing fluxed welding electrodes which comprises forming longitudinally and circumferentially spaced indentations in wire stock, pressing the stock to at least partially smooth out irregularities in the surface of the rod, and then passing the wire in substantially a horizontal path through a fluxing bath and further pressing the wire below the surface of the flux to compress fluxing material in said indentations and remove any irregularities in the surface of the rod.

CYRIL A. WEYBRECHT.
EDGERTON R. PARKER.